United States Patent
Chen et al.

(10) Patent No.: US 7,302,652 B2
(45) Date of Patent: Nov. 27, 2007

(54) LEAKAGE CONTROL IN INTEGRATED CIRCUITS

(75) Inventors: Zhanping Chen, Portland, OR (US); Lakshman Thiruvenkatachari, Santa Clara, CA (US); Shahram Jamshidi, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 190 days.

(21) Appl. No.: 10/404,937

(22) Filed: Mar. 31, 2003

(65) Prior Publication Data
US 2004/0194037 A1  Sep. 30, 2004

(51) Int. Cl.
*G06F 17/50* (2006.01)
(52) U.S. Cl. ....................................................... 716/4
(58) Field of Classification Search .................... 716/4, 716/1
See application file for complete search history.

(56) References Cited

U.S. PATENT DOCUMENTS

| | | | | |
|---|---|---|---|---|
| 6,014,751 | A * | 1/2000 | Kardach et al. | 713/324 |
| 6,191,606 | B1 * | 2/2001 | Ye et al. | 326/31 |
| 6,493,856 | B2 * | 12/2002 | Usami et al. | 716/10 |
| 6,687,883 | B2 * | 2/2004 | Cohn et al. | 716/4 |

OTHER PUBLICATIONS

Chen, Zhanping, et al., "Estimation of standby leakage power in CMOS circuits considering accurate modeling of transistor stacks", *Proceedings of the International Symposium on Low Power Design*, (Aug. 10-12, 1998), 239-244.

Chen, Z., et al., "IDDQ Testing for Deep Submicron ICs: Challenges and Solutions", *IEEE Design and Test of Computers*, 19, (2002), 24-33.

Goldberg, D. E., "Genetic Algorithms in Search, Optimization & Machine Learning", *Addison-Wesley, Reading, MA*, Chapters 1, 4, 5, 7 and 8, (1989), 1-25, 89-216, and 261-312.

Holland, John H., "Adaptation in Natural and Artificial Systems", *University of Michigan Press, Ann Arbor, MI*, Chapters 3, 8 and 9, (1975), 32-65 and 141-170.

Roy, K., et al., "Multiple Vdd Multiple Vth (MVCMOS) for Lower Power Applications", *1999 International Symposium on Circuits and Systems*, 1, (1999), 366-370.

Wei, Liqiong, et al., "Design and optimization of low voltage high performance dual threshold CMOS circuits", *Proceedings—Design Automation Conference*, (Jun. 15-19, 1998), 489-494.

* cited by examiner

*Primary Examiner*—Jack Chiang
*Assistant Examiner*—Brandon W. Bowers
(74) *Attorney, Agent, or Firm*—Schwegman, Lundberg & Woessner, P.A.

(57) ABSTRACT

Although there are a number of techniques available to reduce leakage current, there is still considerable room for improvement. Accordingly, the present inventors devised, among other things, an exemplary method which entails defining first and second leakage-reduction vectors for respective first and second portions of an integrated circuit, such as a microprocessor. The leakage-reduction vectors, in some embodiments, set the first and second portion to minimum leakage states and thus promise to reduce leakage power and extend battery life in devices that incorporate this technology.

11 Claims, 5 Drawing Sheets

LEAKAGE CONTROL IN INTEGRATED CIRCUITS

TECHNICAL FIELD

The present invention concerns methods, systems, circuits, and software for controlling leakage current in integrated circuits.

BACKGROUND

In recent years, the popularity of battery-powered electronic devices, such as laptop computers, personal digital assistants, and cellular telephones, has grown dramatically. This growth, in turn, has fueled consumer demand and expectations for longer battery life, and driven manufacturers and researchers to focus more attention on improving the energy efficiency of the microprocessors and other integrated circuits that enable these devices.

Integrated circuits, also known as "chips," are interconnected networks of electrical components, fabricated on a common foundation, or substrate, of semiconductor material. These circuits typically comprise millions of microscopic transistors. A key aspect of energy efficiency in integrated circuits is the control of leakage current in these transistors.

Leakage current refers to electric current that a transistor conducts when turned off. Ideally, this current is zero; however, in practice, all transistors exhibit some level of leakage current. (Leakage current is analogous to water that flows from a leaky faucet.) The cumulative leakage for a circuit having millions of transistors can amount to a significant amount of wasted power—known as leakage power. For example, in some circuits, leakage power may account for as much as one third of total power usage.

Although there are a number of techniques available to reduce leakage current, there is still considerable room for improvement. For example, one prevailing technique is vector control, which entails applying a single, optimized input vector (that is, a particular set of input signals) to an entire integrated circuit to lock its transistors in a collectively reduced or optimal leakage state. However, in studying this technique, the present inventors have recognized that it becomes increasingly ineffective as circuit complexity or size increases.

Accordingly, there is a need for better ways of reducing leakage current in integrated circuits, particularly larger, complex circuits, such as microprocessors.

DETAILED DESCRIPTION OF EXEMPLARY EMBODIMENTS

This description, which references and incorporates the above-identified figures and the appended claims, describes one or more specific embodiments of one or more inventions. These embodiments, offered not to limit but only to exemplify and teach the one or more inventions, are shown and described in sufficient detail to enable those skilled in the art to implement or practice the invention. Thus, where appropriate to avoid obscuring the invention, the description may omit certain information known to those of skill in the art.

Figure 1:
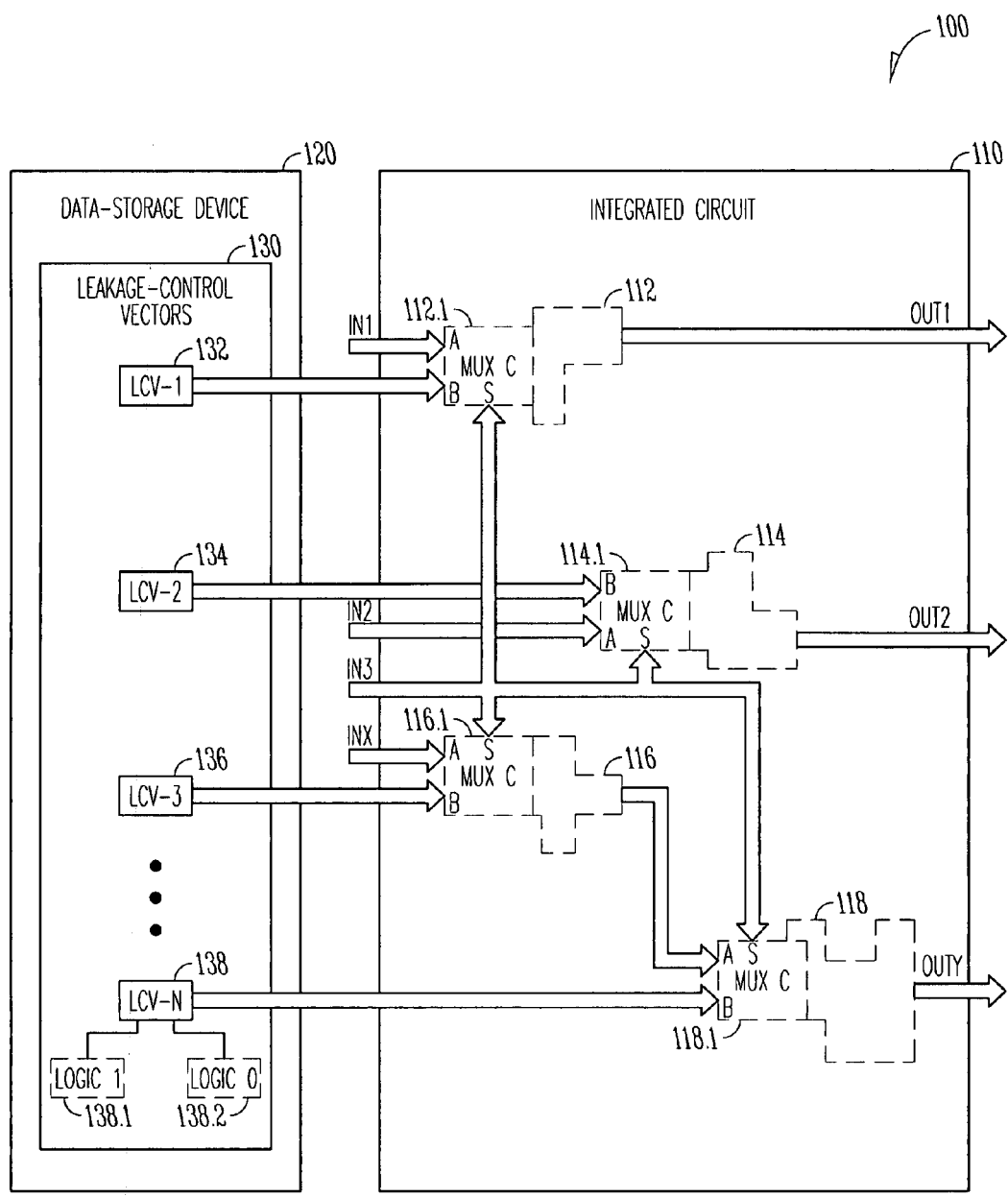
FIG. 1 is a block diagram of an exemplary leakage-reduction system 100, corresponding to one or more embodiments of the present invention.

FIG. 1 shows an exemplary leakage-reduction system 100 according one or more embodiments of the present invention. System 100 includes a digital integrated circuit 110, a data-storage device 120, and a leakage-control data structure 130.

Specifically, circuit 110 includes: N circuit portions, of which portions 112, 114, 116, and 118 are representative; X primary (or circuit boundary) inputs, of which IN1, IN2, IN3, and INX, are representative; and Y primary outputs, of which OUT1, OUT2, and OUTY are representative.

Circuit portions 112-118 generally include any portion of circuitry in the integrated circuit. In the exemplary embodiment, which concerns a complex digital CMOS (complementary metal-oxide-semiconductor) circuit, such as a microprocessor, each portion includes non-critical-path components (not shown separately) and embodies one or more forms of leakage-reduction technology. Exemplary forms of leakage-reduction technology include multiple-supply voltage (Vcc) CMOS technology, multiple-threshold CMOS, sleep-transistor structure, and reverse-body bias CMOS. In some embodiments, one or more of the circuit portions embody all of these leakage-reduction technologies; in others, various circuit portions embody combinations of one, two, or three of these technologies.

Additionally, circuit portions 112-118 include respective multiplexers 112.1-118.1, with each multiplexer having input sets A and B, an output set C, and a select input S, with each input set having of one or more inputs, and each output set having one or more outputs. (Multiplexers 112-118 may have different numbers of inputs and outputs.) Input sets A for multiplexers 112.1, 114.1, and 116.1 are coupled respectively to primary inputs IN1, IN2, and INX, and input set A for multiplexer 118.1 is coupled to an internal output of circuit portion 116. Output sets C for multiplexers 112.1, 114.1, 116.1, and 118.1 are coupled to input nodes (not shown) of their respective circuit portions. Select input S for each multiplexer selectively couples its set A or set B inputs to its set C outputs. In the exemplary embodiment, select input S is coupled to primary input IN3, which receives a clock-enable signal. The clock-enable signal, at least in a microprocessor context, is indicative of a standby or power-conservation mode; some other embodiments may couple the select input to a gated clock signal or other internal or external control signal. Set B inputs for the multiplexers are coupled to data-storage device 120.

Data-storage device 120 includes a machine-readable medium, such as a volatile or non-volatile memory. In the exemplary embodiment, device 120 includes a non-volatile memory positioned on an integrated-circuit chip with circuit 10. However, in other embodiments, device 120 is positioned on a separate integrated circuit or data-storage apparatus. Data-storage device 120 includes leakage-control data structure 130.

Leakage-control data structure 130 includes a set of one or more leakage-control vectors (LCVs), such as LCVs 132, 134, 136, and 138. Each LCV corresponds to one of the circuit portions and includes a set of binary input values selected to establish a standby leakage current level for its corresponding circuit portion. More precisely, LCVs 132, 134, 136, and 138 include respective sets of binary input values for establishing standby leakage currents for respective circuit portions 112, 114, 116, and 118. In the exemplary embodiment, each LCV is defined to minimize or at least reduce the standby leakage current for its corresponding circuit portion relative to the leakage that would occur with other input vectors. In some embodiments, one or more of the LCVs may be applicable to more than one circuit portion. The LCVs can be generated randomly, by enumeration, by adaptive algorithm, such as a genetic algorithm, or by some heuristic.

General operation of system 100 entails integrated circuit 110 receiving a command, such as standby-mode or sleep-mode command, from an operating system, power-management system, or other command-issuing component of a mobile device (not shown in this figure). In response to the command, which can, for example, take the form of a clock-disabling signal on input IN3, integrated circuit 110 couples the input nodes of each of circuit portions 112-118 to input set B of its corresponding multiplexer and thus its corresponding LCV in data-storage device 120. (In some embodiments, the LCVs may be effectively hardwired into the integrated circuit by coupling the set B inputs of the multiplexers to appropriate logic voltage levels, such as upper and lower power supply nodes, in the integrated circuit rather than to a data-bearing memory structure inside or outside the circuit. As an example, FIG. 1 shows this alternative hard-wired implementation for LCV 138, which includes connections to respective logic-one and logic-zero voltages 138.1 and 138.2, where the broken lines are meant to signify the alternate implementation and it is understood that as many voltage connections as necessary are provided to constitute a complete input vector for circuit portion 118 or any of the other circuit portions having a similarly implemented LCV.)

As a result of applying the LCVs, circuit portions 112-118 enter a low- or reduced leakage state based on the applied LCVs. The LCVs remain in effect until another command, such as a clock-enabling signal or other control signal deselects the set B inputs of the multiplexer. In some embodiments, the multiplexers may include multiple select inputs to allow selection and application of other sets of specialized input vectors to the circuit blocks, for example, to warm, restart, or otherwise prepare the circuit for continued activity.

Figure 2:
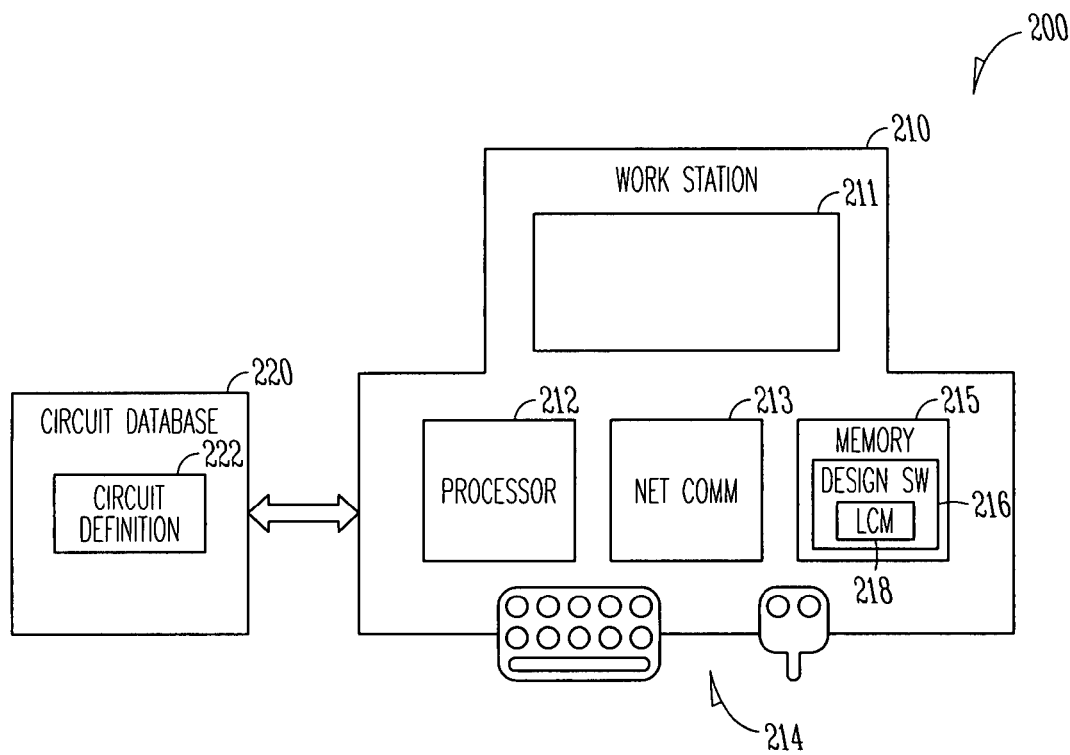
FIG. 2 is a block diagram of an exemplary circuit-design system 200 corresponding to one or more embodiments of the present invention.

FIG. 2 shows an exemplary circuit-design system 200 which can be used to define a leakage-current control system, such as system 100. System 200 includes a workstation 210 and a circuit-design database 220. In addition to conventional elements, such as a display 211, a processing unit (or processor) 212, network communications device 213, a user-interface system 214, a memory system 215, workstation 210 includes circuit-design software 216. (Software 216 is distributed or accessed in whole or in part via a computer network or on computer-readable media, such as an magnetic or optical disk.) In the exemplary embodiment, circuit-design software 216, which is stored a volatile or non-volatile portion of memory system 215 (such as on an electric, ferroelectric, magnetic, or optical storage medium) includes a leakage-control module 218 for receiving completed circuit designs, such as circuit-definition data 222 from circuit database 220, and outputting LCVs along with any circuit modifications for enabling their usage. (Note that in some embodiments, the LCVs may be effectively hard-wired into the circuitry using multiplexers coupled to appropriate logic voltage levels, such as power supply nodes, rather than to a memory structure.)

Figure 3:
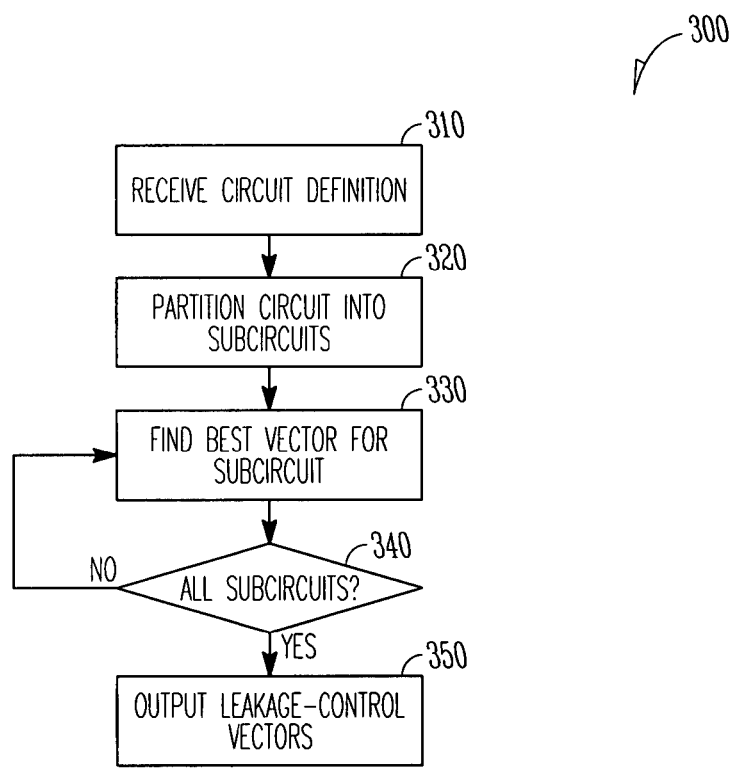
FIG. 3 is a flow chart of an exemplary method implemented in circuit-design system 200 in FIG. 2 and corresponding to one or more embodiments of the present invention.

FIG. 3 shows a flowchart 300 of a first exemplary method of defining a leakage-reduction system, which is embodied in leakage-control module 218. Flow chart 300 includes process blocks 310-350. Though these blocks (as well as the blocks in other flow charts in this document) are arranged and described serially in the exemplary embodiment, other embodiments may reorder the blocks, omit one or more blocks, combine two or more blocks, and/or execute two or more blocks in parallel using multiple processors or a single processor organized as two or more virtual machines or subprocessors. Moreover, still other embodiments implement the blocks as one or more specific interconnected hardware or integrated-circuit modules with related control and data signals communicated between and through the modules. Thus, this and other exemplary process flows in this document are applicable to software, firmware, hardware, and other types of implementations.

Exemplary execution begins at block 310, which entails input or receipt of a circuit definition or specification. In the exemplary embodiment, this definition takes the form of a net listing. Execution then advances to block 320.

Figure 4:
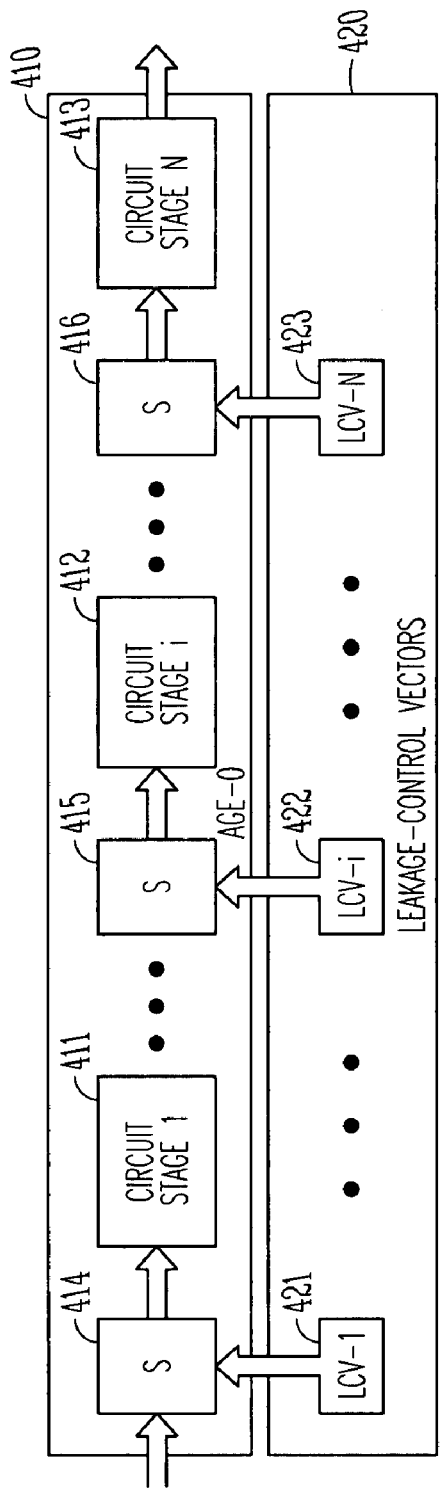
FIG. 4 is a block diagram of another exemplary leakage-reduction system 400 corresponding to one or more embodiments of the present invention.

Block 320 entails partitioning the circuit into two or more portions or clusters. For circuits with pipeline structure, the exemplary embodiment partitions the pipeline structure at the sampling elements, such as flip-flops or latches, between the various circuit stages as shown in exemplary leakage-reduction system 400 in FIG. 4.

More particularly, system 400 includes an integrated circuit 410 and a leakage-control data structure 420. Integrated circuit 410, which in some embodiments constitutes a microprocessor or digital signal processor, includes N pipelined circuit stages of which circuit stages 411, 412, and 413 are representative. Circuit stages (or blocks) 411-413 are driven by respective sampling elements 414, 415, and 416. In the exemplary embodiment, each of these sampling elements includes a latch or a flip-flop.

Leakage-control data structure 420 includes a set of one or more LCVs, such as LCVs 421, 422, 423, which are respectively associated with flip-flop stages 414, 415, and 416. The pipeline-based partitioning illustrated in FIG. 4 has an advantage that no extra control circuit is needed to support the use of an LCV for each stage. Setting the leakage state for each pipeline stage entails setting or resetting the between-sampling-element, such as a flip-flop, based on the values in the corresponding LCV.

FIG. 3, shows that after partitioning the circuit at block 320 into a number of portions or clusters, execution advances to block 330, which entails determining an LCV (input vector) for each of the clusters. Generally, this determination entails determining the leakage current for a plurality of possible input vectors for the cluster and then selecting one that yields a minimum leakage current as the LCV for the subcircuit. The vectors that are tested can be generated randomly, by enumeration, by an adaptive algorithm, such as a genetic algorithm, or by some heuristic. Execution then continues at block 340.

Block 340 determines whether LCVs for all the clusters defined at block 320 have been determined. If there are clusters that lack a corresponding LCV, then execution returns to block 350 to determine an LCV for another one of the defined clusters. However, if each of the defined clusters has a corresponding LCVs, execution continues to block 350.

Block 350 entails outputting the LCVs to a data-storage device, such as device 120 in FIG. 1. Other embodiments output a circuit definition that includes embedded memory and multiplexers similar to that shown in FIG. 1. Still other embodiments, output a circuit definition with hard-wired LCVs, using multiplexers and appropriate logic-level voltages in the integrated circuit as binary values. In some embodiments, each LCV is output after execution of block 330 and before execution of block 340.

Figure 5:
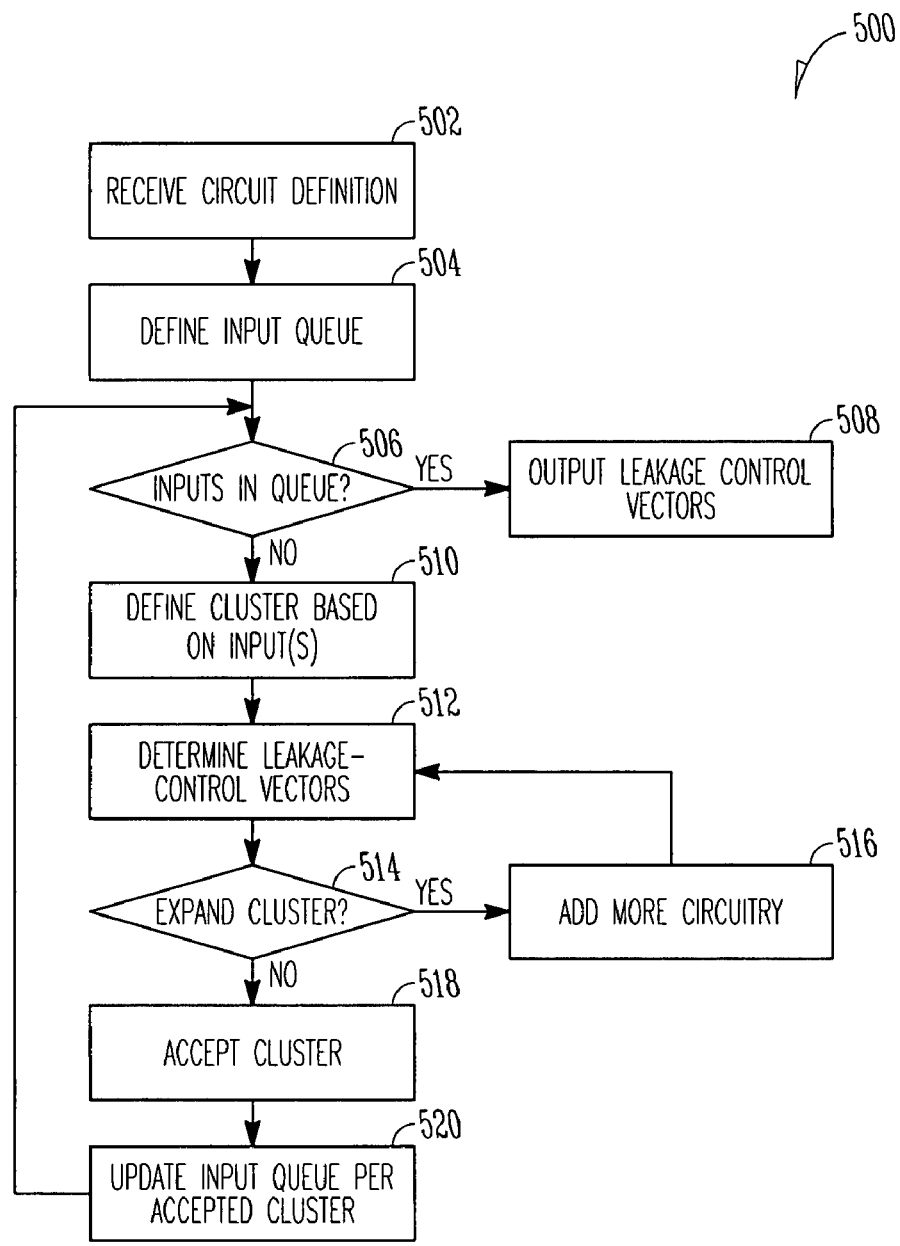
FIG. 5 is a flow chart of another exemplary method implemented in circuit-design system 200 in FIG. 2 and corresponding to one or more embodiments of the present invention.

FIG. 5 shows a flow chart 500 of a second exemplary method of designing a leakage-reduction system, corresponding to one or more embodiments of leakage-control module 218. The second method explicitly recognizes that some circuit designs may use additional control circuitry to enable use of multiple LCVs and provides a trade-off analysis to account for leakage of this additional circuitry. Specifically, flow chart 500 includes process blocks 502-520, and begins with process block 502.

Block 502 entails receiving a circuit definition having primary inputs and outputs (or more generally boundary nodes). In the exemplary embodiment, the primary inputs include the data and address pins of the circuit, and the primary outputs include other pins that output data or otherwise indicate a boundary of the circuit. However, in other embodiments, any input pin or node may be treated as a primary input. Some embodiments may define the primary inputs and outputs to effectively confine or focus activities of the leakage-control module to specific areas of a circuit definition, such as non-critical path areas. Exemplary execution continues at block 504.

Block 504 entails defining an input queue including the primary inputs. In the exemplary embodiments, the Q is arranged such that the primary inputs are arranged in an order corresponding to their arrangement on a pin-out diagram of the circuit. However, some other embodiments use other input ordering. Execution then advances to block 506.

Block 506 determines if the input queue is empty or not. If the input queue is determined to be empty, execution branches to block 508, which entails outputting results of the exemplary method in the form of new circuit definition and a set of corresponding LCVs. (Some embodiments output the LCV and the new circuit definition cluster by cluster after the acceptance of each cluster at block 518 and before execution of block 520.) However, if the input queue is determined not to be empty, execution advances to block 510.

Block 510 entails defining a temporary circuit cluster. In the exemplary embodiment, this entails selecting an input from the queue, for example, the next available input; searching the circuit definition for any subcircuits or circuit blocks, such as logic gates, driven by the selected input. (Some embodiments select two or more inputs at a time, such as two or more adjacent inputs in the queue.) If any outputs of the found circuit blocks are not primary outputs of the original circuit, the exemplary embodiment adds one or more cluster-boundary devices, such as multiplexers, flip-flops, latches, or other data-sampling elements, between each of these non-primary outputs and the inputs of any circuit blocks it drives, to define a temporary cluster. Execution proceeds to block 512.

Block 512 entails determining a leakage-control vector for the temporary cluster. The exemplary embodiment determines an optimal leakage-control vector for the temporary cluster by random testing, by enumeration, by adaptive algorithm, such as a genetic algorithm, or by some heuristic. The leakage-control vector for the temporary cluster is associated with a temporary leakage value defined as the temporary-best-leakage (tmpBestLkg) for the original circuitry of the temporary cluster and an extra-leakage value (extraLkg) for the added boundary devices. The leakage values can be determined using a simulation program or other technique, such as equation-based evaluation.

Block 514 entails determining whether to expand the temporary cluster. In the exemplary embodiment, this determination entails determining whether the temporary cluster meets the following criterion:

$$\text{tmpBestLkg} + \text{extraLkg} <= (1+t\%)\text{avgLkg},$$

where extraLkg denotes leakage of the temporary cluster attributable to the added cluster-boundary device (and supporting circuitry); t % denotes the targeted reduction percentage, for example −5, −10, −15, −20, or −25 percent; and avgLkg denotes the average leakage of the temporary cluster. The exemplary embodiment defines the average leakage as the cumulative leakage of the temporary cluster for a number of input vectors divided by the number of input vectors. Another embodiment defines the average leakage for the cluster as the number of gates or circuit blocks in the original circuit times the ratio of the total leakage for the original circuit to the number of gates (or circuit blocks) in the original circuit. Still other embodiments may use other measures of central tendency to define appropriate cluster-growth or -selection criteria. Other embodiments may define leakage-based, cluster-shrinkage criteria that recursively or iteratively shrinks from larger temporary clusters down toward smaller optimal cluster sizes, by for example, determining whether the leakage for the current temporary cluster is less than that for the previous temporary cluster, before further shrinking the cluster.)

Block 516, which follows a determination at block 514 to expand the cluster, entails adding more circuitry to the current temporary cluster. In the exemplary embodiment, this entails copying the current temporary cluster to a previous temporary cluster, removing any previously added boundary devices, and then determining whether any of the outputs of the temporary cluster (minus the previously added boundary devices) are non-primary outputs. If this cluster has any non-primary outputs, the exemplary method adds any circuit blocks driven by these non-primary outputs to the cluster along with corresponding cluster-boundary devices to any non-primary outputs for these added circuit blocks, thereby defining a new temporary cluster. (Other embodiments need not expand the cluster by adding circuit blocks that are driven by non-primary outputs. For example, some embodiments may expand the cluster by adding one or more other adjacent or even non-adjacent inputs from the queue along with circuit blocks driven by these added inputs. Still other embodiments may add circuit blocks without regard for their input connections.)

If, however, the current temporary cluster has no non-primary outputs (that is, it has only primary outputs), then a primary input, such as the next available primary input, is selected from the input queue, and added to the current temporary cluster, along with any circuit blocks driven by this added input and any corresponding cluster-boundary devices. Execution then returns to block 512 to determine whether to further expand the cluster. If the new temporary cluster is unacceptable, indicating that the temporary cluster has grown too large, then execution advances to block 518.

Block 518 entails accepting a defined cluster. In the exemplary embodiment, the cluster that triggers execution of block 518 is actually one-iteration too large; so, acceptance entails storing the previous temporary cluster to a list or file of permanent cluster definitions for the original circuit definition. (Other embodiments may accept other defined clusters based on the structure of the expansion criteria.) Execution then continues at block 520.

Block 520 updates the input queue based on the accepted cluster. To this end, the exemplary embodiment adds any non-primary outputs of this accepted cluster to, for example, the front or the back of, the input queue created at block 504, and clears or restores any stored variables of the current temporary and previous temporary clusters. Execution then returns to block to 506.

Figure 6:
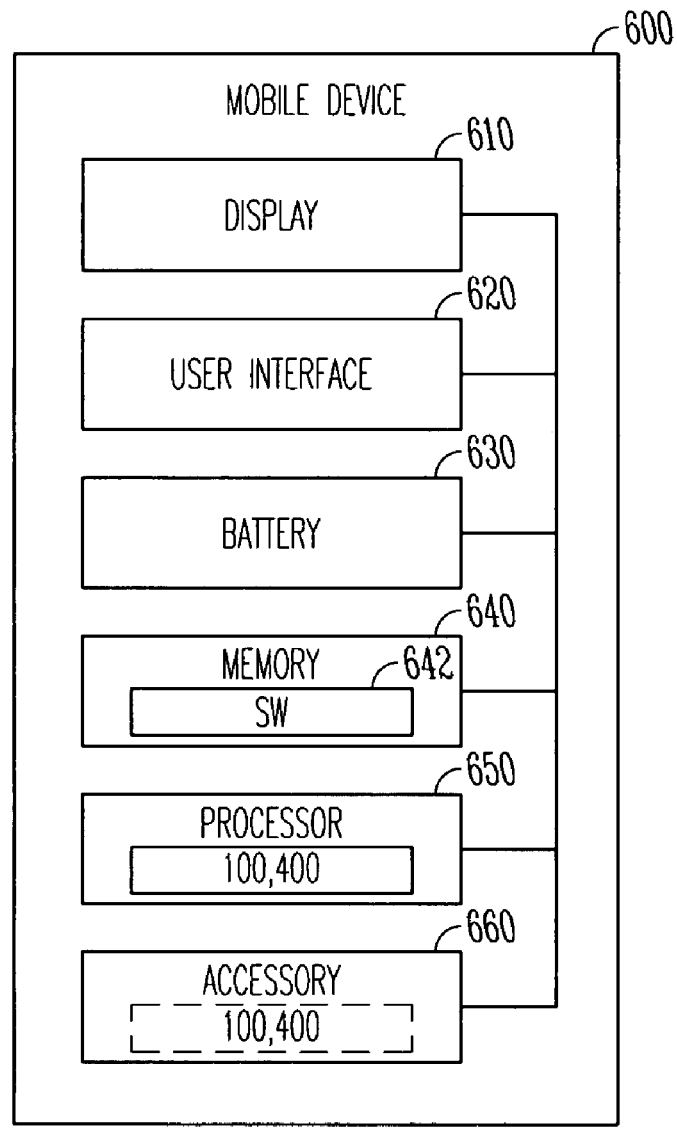
FIG. 6 is a block diagram of an exemplary mobile device 600 incorporating a leakage-reduction system, such as system 100 or system 400, and thus corresponding to one or more embodiments of the present invention.

FIG. 6 shows an exemplary mobile device 600, which incorporates leakage reduction system 100 or 400. (System 100 or 400 can also be embodied within a non-mobile device, such as workstation 210 in FIG. 2.) Specifically, device 600, which takes the form of a laptop computer, personal digital assistance, mobile telephone, or other battery-powered appliance or entertainment device, includes a display 610, a user interface system 620, a battery system 630, a memory system 640, a processing unit 650, and an accessory 660.

Memory system 640, which can include any form of volatile or non-volatile data-storage technology, such as electric, ferroelectric, magnetic, or optical, includes standby power software 642. Processing unit 650 includes a microprocessor, digital-signal processor, and/or other integrated circuit, with at least one of these components including a leakage-reduction system, such as one corresponding to system 100 or 400 or a related embodiment described above.

Accessory 660 includes interface circuitry and related connectors for adding detachable modules to system 600. Exemplary modules include mobile telephone transceivers, network communicators, memory extensions, infrared transceivers, digital cameras, barcode readers, digital media players, etc. In some embodiments, these modules are permanently integrated into accessory 660 and thus form a permanent part of system 600. Additionally, one or more components of accessory 660 may include a leakage-reduction system corresponding to system 100 or 400 or a related embodiment described above.

The embodiments described in this document are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

The invention claimed is:

1. A method of operating a digital circuit, comprising:
    applying a first input vector to set a first portion of the digital circuit to a power-conservation mode; and
    applying a second input vector to set a second portion of the digital circuit to the power-conservation mode, wherein the second input vector is independent of the first input vector;
    wherein applying either one or both of the first input vector and the second vector includes:
        receiving a circuit definition having one or more primary inputs and one or more primary outputs;
        defining an input queue including one or more primary inputs;
        selecting until the input queue is empty a primary input from the queue;
        searching a circuit definition for any subcircuits driven by the selected primary input, and for any outputs of the subcircuits that are not primary outputs of the original digital circuit, add one or more cluster boundary devices to define a temporary cluster; and
        determining a leakage control vector for the temporary cluster associated with a temporary leakage value defined as the temporary-best-leakage (tmpBest Lkg) for the original circuitry of the tempo cluster and an extra leakage value (extraLkg) for the added cluster boundary devices.

2. The method of claim 1, wherein the first and the second input vectors include respective sets of binary values for setting the first and second portions to respective reduced leakage current levels relative to respective leakage current levels determined for other sets of binary values for the first and second portions.

3. The method of claim 1:
    wherein the digital circuit includes a clock-enable input for receiving a clock-enable signal and a first node for providing a first logic voltage;
    wherein providing the first input vector to set a first portion of a digital circuit to a power-conservation mode, comprises:
        providing a multiplexer having an input coupled to the first logic voltage and a select input coupled to the clock-enable input.

4. The method of claim 1:
    wherein the digital circuit includes memory; and
    wherein providing the first input vector to set a first portion of a digital circuit to a power-conservation mode, comprises storing the first input vector in the memory.

5. The method of claim 1, wherein the digital circuit comprises a processor.

6. The method of claim 1:
    wherein providing the first input vector to set the first portion of the digital circuit to a power-conservation mode includes determining the first input vector for a first portion of an integrated-circuit definition, with the first portion of the integrated-circuit definition including a first set of one or more input nodes and the first input vector including a set of one or more binary values for setting the first portion to a reduced leakage current level relative to leakage current levels determined for other possible input vectors for the first portion of the integrated-circuit definition; and
    wherein providing the second input vector to set the second portion of the digital circuit to the power-conservation mode includes determining the second input vector for a second portion of the integrated-circuit definition, with the second portion including a second set of one or more input nodes and the second input vector including a set of one or more binary values for setting the second portion to a reduced leakage current level relative to leakage current levels determined for other possible input vectors for the second portion of the integrated-circuit definition.

7. The method of claim 1, further comprising providing the first input vector and the second input vector as parts of a data structure, wherein the first input vector is to apply to the first portion of the digital circuit to establish a reduced leakage state in the first portion relative to leakage states associated with other possible input vectors for the first portion, and wherein the second input vector is to apply to the second portion of the digital circuit to establish a reduced leakage state in the second portion relative to leakage states associated with other possible input vectors for the second portion.

8. The method of claim 1, further comprising:
determining whether to expand the temporary cluster includes determining whether the temporary cluster meet the following criterion:

$$tmpBestLkg+extraLkg<=(1+t\%)avgLkg,$$

wherein extraLkg denotes leakage of the temporary cluster attributable to the added cluster-boundary device (and supporting circuitry); t % denotes the targeted reduction percentage, for example 5, 10, −15, −20, or 25 percent; and avgLkg denotes the average leakage of the temporary cluster.

9. A method of operating a digital circuit comprising:
applying an input vector to set a portion of the digital circuit to a power-conservation mode, wherein applying the input vector includes determining the input vector for the portion of the digital circuit, with the portion of the digital circuit including a set of one or more input nodes and the input vector including a set of one or more binary values for setting the portion of the digital circuit to a reduced leakage current level relative to leakage current levels determined for other possible input vectors for the portion of the digital circuit;
wherein determining the input vector for the portion of the digital circuit includes receiving an integrated-circuit definition of the portion of the digital circuit and defining the portion of the digital circuit based on leakage criteria;
wherein the integrated-circuit definition includes a plurality of primary inputs and primary output nodes and a plurality of logic units, each logic unit having an input and an output, with the input coupled to at least one of the primary input nodes or the output of another of the logic units and the output coupled to at least one of the primary output nodes or the input of another of the logic units; and
wherein defining the portions of the digital circuit based on leakage criteria comprises:
defining a set of input nodes based on an integrated-circuit definition and including one or more of the plurality of primary input nodes;
selecting one or more of the input nodes from the defined set of input nodes;
defining a first temporary portion based on the selected input nodes, with the temporary portion including the selected input node and at least one of the logic units coupled to the selected input node;
determining a leakage-control vector for the temporary portion, with the leakage-control vector including a set of one or more binary input values for respectively reducing leakage current of the temporary portion relative to leakage current quantities associated with at least some other sets of binary input values applied to the temporary portion;
determining whether to adjust the first temporary portion based on a leakage current quantity associated with the determined leakage-control vector; and
defining the first portion in response to a determination not to adjust the first temporary portion.

10. The method of claim 9, wherein applying an input vector to set a portion of the digital circuit to a power-conservation mode including applying a first input vector to a first portion of the digital circuit and applying a second input vector to the a second portion of the digital circuitry, and wherein the second input vector is a different input vector from the first input vector.

11. The method of claim 9, wherein the portion of the digital circuit includes:
at least an input and an output;
a logic circuit coupled between the input and the output; and
a multiplexer or flip-flop coupled to the input or the output.

* * * * *

UNITED STATES PATENT AND TRADEMARK OFFICE
CERTIFICATE OF CORRECTION

| | | |
|---|---|---|
| PATENT NO. | : 7,302,652 B2 | Page 1 of 1 |
| APPLICATION NO. | : 10/404937 | |
| DATED | : November 27, 2007 | |
| INVENTOR(S) | : Chen et al. | |

It is certified that error appears in the above-identified patent and that said Letters Patent is hereby corrected as shown below:

In column 9, line 18, in Claim 8, delete "5, 10," and insert -- –5, –10, --, therefor.

In column 9, line 18, in Claim 8, delete "25" and insert -- –25 --, therefor.

In column 10, line 31, in Claim 10, before "second portion" delete "the a" and insert -- the --, therefor.

Signed and Sealed this

Twenty Second Day of April, 2008

JON W. DUDAS
*Director of the United States Patent and Trademark Office*